Sept. 30, 1930.  B. D. ADAMS  1,776,768
LANDING GEAR FOR AIRCRAFT
Filed Nov. 2, 1929
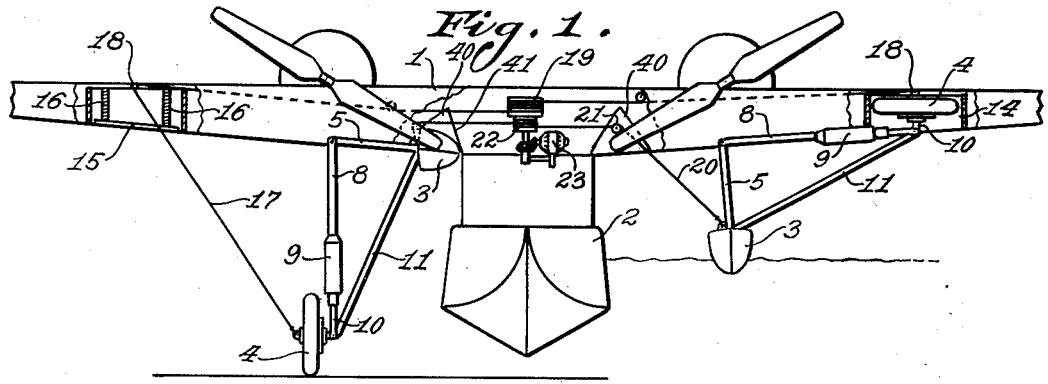
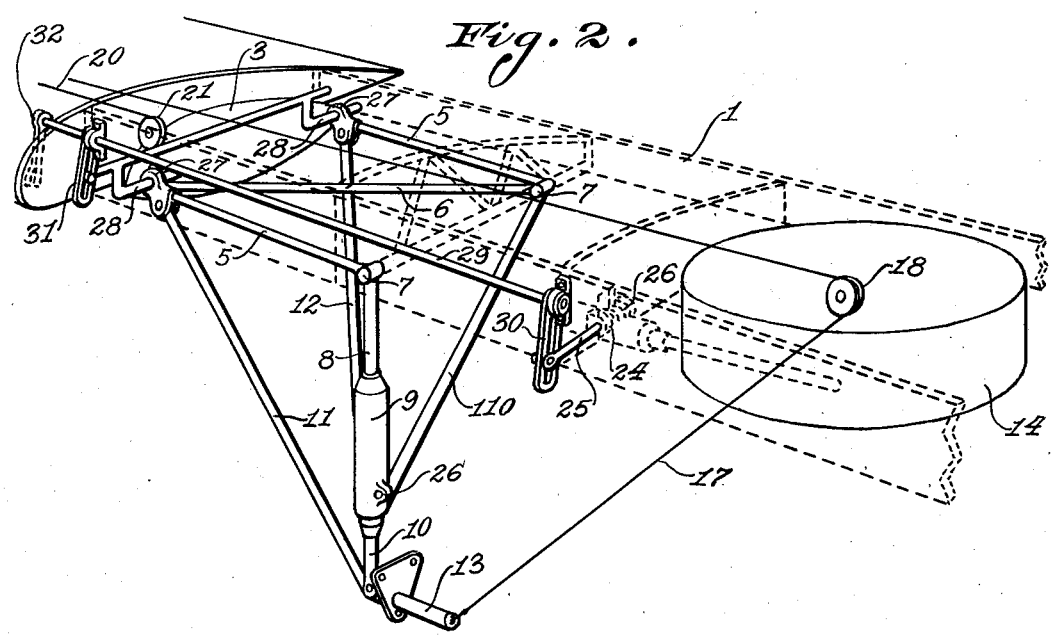
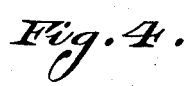
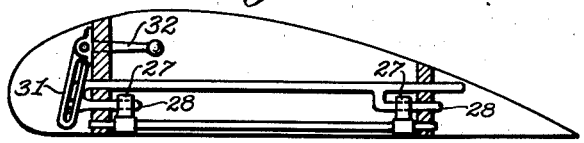
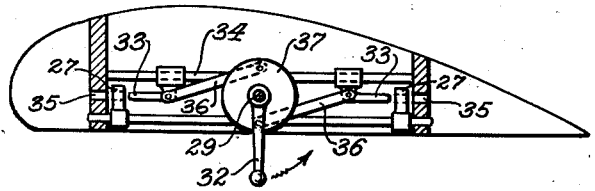
Inventor:
BURKE D. ADAMS,
By John W. Bruninga
His Attorney.

Patented Sept. 30, 1930

1,776,768

UNITED STATES PATENT OFFICE

BURKE DOWLING ADAMS, OF ST. LOUIS, MISSOURI, ASSIGNOR OF ONE-HALF TO P. DE C. BALL, OF ST. LOUIS, MISSOURI

LANDING GEAR FOR AIRCRAFT

Application filed November 2, 1929. Serial No. 404,230.

This invention pertains to landing gears for aircraft and more particularly to interchangeable landing gears for amphibian airplanes and the like.

One of the objects of this invention is to provide an interchangeable landing gear by which either landing wheels or a set of floats may be placed in position for landing so that the airplane may land either on land or water.

Another object of this invention is to provide such interchangeable landing gear in which those landing elements which are not positioned for use will be suitably housed so as to reduce their air resistance to a minimum.

Another object is to provide such a landing gear which may be operated in a convenient manner from the pilot's station.

Another object is to provide a landing gear having landing wheels provided with a resilient mounting so as to absorb the shocks incident to landing.

Another object is to provide a landing gear construction which will be strong and rigid and easily manipulated.

Another object is to provide such interchangeable landing gear which will be securely locked in either landing position.

Further objects will appear from the following description taken in connection with the accompanying drawing, in which:

Figure 1 is a front view partially in section of an airplane equipped with landing gear embodying this invention.

Figure 2 is a perspective view of the landing gear showing parts of the airplane structure on which it is mounted.

Figure 3 is a sectional view of part of the airplane structure showing the means for locking the landing gears; and Figure 4 is a view similar to Fig. 3 showing a modified form of locking device.

Referring now to the drawing, 1 designates the wing structure of an airplane. This may be equipped with a suitable hull 2 for landing on the water. The landing gear includes a pair of auxiliary floats 3 and a pair of landing wheels 4. The arrangement is such that either the floats 3 may be positioned to engage the water on each side of the hull 2 or the landing wheels 4 may be lowered to a position below the hull 2 so as to engage the ground and provide clearance for the hull above the ground.

A frame comprising a pair of struts 5 and a pair of diagonal braces 6 is pivoted in any suitable manner to the wing structure at 7. This structure, of course, is the same on opposite sides of the hull on the underside of each wing. Only one of these structures will, however, be described. One of the floats 3 may be mounted on the free end of the frame 5, 6 in any suitable manner.

Extending at right angles to this frame is a strut 8 provided with a spring barrel 9 within which may be mounted any suitable spring device adapted to absorb the shock of landing on the ground. The lower extension 10 of the strut 8 is adapted to slide into the barrel 9 against the tension of the spring device under the impact of the landing shock. A brace 110 pivoted to the wing structure at one of the pivots 7 and extending downwardly has its lower end secured to the spring barrel 9 so as to brace the strut 8. A second pair of braces 11 and 12 is pivoted to the free end of the frame 5, 6 and extending downwardly both braces are secured to the lower end of the extension 10 so as to provide side bracing for the strut 8. Rigidly secured to the extension 10 at right angles thereto is a wheel spindle 13 adapted to receive the landing wheel 4. This structure forms a sort of flexible bracket having a long leg including the strut 8 on which the landing wheel is mounted and a short leg including the struts 5 on which the float 3 is mounted. This bracket is pivoted at 7 to the wing structure so that it may be swung into one position or the other in order to bring either the float or the wheel into operating position.

A recess 14 is provided within the wing structure to receive and house the wheel 4 when in inoperative position. The wheel is thus housed within the wing structure where it is protected against wind resistance. A closure 15 may be provided for the recess 14 mounted on springs 16 so that it may be moved out of the way when the wheel enters the recess but will return to its closing position when the wheel is moved to operating position. A similar recess 40 having a closure 41 may be provided in the wing structure to receive and house the float 3. This recess may, however, be so formed as to receive only part of the float since the latter is perfectly stream lined and its air resistance is practically negligible.

A set of connections is provided for moving either the wheels or the floats to operating position. These connections include cables 17 passing over pulleys 18 within the wheel recesses and thence to a suitable winding drum 19, and cables 20 connected to the floats 3 and passing over pulleys 24 to a winding drum 22. The drum 22 may be smaller than the drum 19 and arranged to pay out its cable when the latter winds up and vice versa. Accordingly, when these drums are rotated in one direction or the other the bracket may be moved on its pivot so as to bring either the floats or the landing wheels into operating position. The different sizes of the drums 19 and 22 are adjusted as to take care of the different extents of movement required for the wheels 4 or the floats 3. The drum may be rotated in any suitable manner as by a hand crank or, as shown in the drawing, by a motor 23.

In order to insure safety the landing gear must be securely locked in either position. Accordingly, one or more ears 24 may be provided in the wing structure adapted to receive a bolt 25 which may be shot through an ear 26 on the spring barrel 9 to lock the gear in position for landing on water with the floats 3 lowered. The frame 5, 6 is provided at its free end with ears 27 adapted to receive the ends of a locking bolt 28. The bolt 28 also engages sockets provided in the wing structure as shown in Figure 3. A shaft 29 extending along the wing structure has fixed thereto links 30 and 31 adapted to operate the bolts 25 and 28 respectively. A manipulative handle 32 may be provided at the operator's station for operating the shaft 29. By these means the landing gear may be securely locked in either position.

In the arrangement of Figure 4 locking bolts 33 are arranged to slide along a guide bar 34 so as to enter the ears 27 on the frame 5, 6. The bolts 33 may also enter sockets 35 in the frame member of the wing structure. A pair of links 36 connect the bar 34 with a crank disc 37 on the shaft 29 to which the operating handle 32 is fixed. By turning the shaft 29, the links 36 will operate to force the bolts 33 outwardly so as to lock the frame.

It will be seen that this invention provides an interchangeable landing gear of simple form. The floats and landing wheels are mounted on pivoted brackets which are provided with connections whereby the brackets on opposite sides of the hull may be moved in unison so as to swing either the floats 3 or the wheels 4 to landing position. These brackets each having a long arm carrying a landing wheel and a short arm carrying a float are thus arranged to place these different landing members at different levels according to whether the landing is to be made on land or water. When either landing device is in operating position the other one is nested within the wing structure so as to reduce its resistance. When the wheels or floats are in operating position the closures 15 or 45 close the recesses 14 or 40 and keep the lower wing surface complete.

The construction of the bracket is such that a resilient strut is provided to take the shock of landing on the wheels and yet this strut is thoroughly braced both laterally and longitudinally. Connections for changing landing gears go to the operator's station where the appropriate change may be made while the machine is in flight, so that the landing gear may be adjusted to suit the surface upon which the landing is to be made.

While this device has been described as a unitary structure it will be understood that certain features or sub-combinations are useful without reference to other features or sub-combinations and that the use of such individual features or sub-combinations is contemplated by this invention and is within the scope of the appended claims.

It is obvious that various changes may be made, within the scope of the appended claims, in the details of construction without departing from the spirit of this invention. It is, therefore, to be understood that this invention is not to be limited to the specific details shown and/or described.

Having thus described the invention what is claimed is:

1. Landing gear for aircraft having wings, comprising, a bracket pivoted to the wing structure and having arms extending in different directions from the pivot, a float on one of said arms, a landing wheel on the other of said arms, and means for moving said bracket on its pivot.

2. Landing gear for aircraft having wings, comprising, a bracket pivoted to the wing structure and having arms of unequal length extending in different directions from the pivot, a float on the shorter of said arms, a landing wheel on the longer of said arms, and means for moving said bracket on its pivot.

3. Landing gear for aircraft having wings, comprising, a bracket pivoted to the wing structure and having arms extending in different directions from the pivot, a float on one of said arms, a landing wheel on the other of said arms, and connections leading to the operator's station adapted to move said bracket selectively to bring either said floats or said wheels to operative position.

4. Landing gear for aircraft having wings, comprising, a bracket pivoted to the wing structure and having arms extending in different directions from the pivot, a float on one of said arms, a landing wheel on the other of said arms, means for moving said bracket on its pivot so as to bring either said floats or said wheels to operative position, and means for locking said bracket in either position.

5. Landing gear for aircraft having wings, comprising, a frame pivoted to the wing structure, a brace pivoted to the free end of said frame, a wheel spindle on the free end of said brace, and a second brace pivoted to the wing structure at said frame pivot and connected to said first brace at said spindle.

6. Landing gear for aircraft having wings, comprising, a frame pivoted to the wing structure and carrying a float at its free end, a brace pivoted to the free end of said frame, a wheel spindle on the free end of said brace, and a second brace pivoted to the wing structure at said frame pivot and connected to said first brace at said spindle.

7. Landing gear for aircraft having wings, comprising, a frame pivoted to the wing structure, a brace pivoted to the free end of said frame, a wheel spindle on the free end of said brace, and a second brace pivoted to the wing structure at said frame pivot and connected to said first brace at said spindle, one of said braces including a yielding strut.

8. Landing gear for aircraft, having wings, comprising, a frame pivoted to the wing structure, a brace pivoted to the free end of said frame, a wheel spindle on the free end of said brace, and a second brace pivoted to the wing structure at said frame pivot and connected to said first brace at said spindle, said second brace including a yielding strut.

9. Landing gear for aircraft having wings, comprising, a frame pivoted to the wing structure, a brace pivoted to the free end of said frame, a wheel spindle on the free end of said brace, and a second brace pivoted to the wing structure at said frame pivot and connected to said first brace at said spindle, the wing having a recess adapted to receive a wheel on said spindle.

10. Landing gear for aircraft having wings, comprising a frame pivoted to the wing structure and carrying a float at its free end, a brace pivoted to the free end of said frame, a wheel spindle on the free end of said brace, and a second brace pivoted to the wing structure at said frame pivot and connected to said first brace at said spindle, the wing having recesses adapted to receive said float and a wheel on said spindle.

In testimony whereof I affix my signature this 22nd day of October, 1929.

BURKE DOWLING ADAMS.